(12) United States Patent
Losey et al.

(10) Patent No.: US 6,397,910 B1
(45) Date of Patent: Jun. 4, 2002

(54) RETREADED TIRE HAVING TREAD WITH OIL RICH RUBBER-BASED ADHESIVE

(75) Inventors: Cheryl Ann Losey, Kent; Arthur Webster Magee; Roger John Hopper, both of Akron; Richard Michael D'Sidocky, Ravenna, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/481,892

(22) Filed: Jan. 12, 2000

(51) Int. Cl.$^7$ .......................... B60C 1/00; B60C 11/00; B60C 11/02
(52) U.S. Cl. .................... 152/209.6; 152/565; 152/532; 156/96; 156/128.1; 156/128.6
(58) Field of Search .............................. 152/209.6, 565, 152/532; 156/96, 110.1, 128.1, 128.6, 130.7, 290, 291; 524/525, 526, 570, 571, 572, 575, 575.5, 764; 525/139

(56) References Cited

U.S. PATENT DOCUMENTS 4,808,657 A * 2/1989 Brown ........................ 524/518
5,951,797 A * 9/1999 Majumdar et al. ............. 156/96

FOREIGN PATENT DOCUMENTS

EP          0643117       3/1995    .......... C09J/121/00

* cited by examiner

*Primary Examiner*—Katarzyna Wyrozebski Lee
(74) *Attorney, Agent, or Firm*—Henry C. Young, Jr.

(57) ABSTRACT

A retreaded tire comprised of a tread and carcass with an intervening rubber layer, conventionally referred to as a cushion, wherein the tread has an oil rich rubber-based adhesive on its inner surface at the interface between said tread and cushion. Said oil rich rubber based adhesive is free, or substantially free, of volatile organic compounds, particularly volatile organic solvents. Alternately, the oil-rich rubber-based adhesive may contain oil and volatile organic solvent wherein oil is the major component insofar as the oil and solvent is concerned.

20 Claims, No Drawings

RETREADED TIRE HAVING TREAD WITH OIL RICH RUBBER-BASED ADHESIVE

FIELD

A retreaded tire comprised of a tread and carcass with an intervening rubber layer, conventionally referred to as a cushion, wherein the tread has an oil rich rubber-based adhesive on its inner surface at the interface between said tread and cushion. Said oil rich rubber based adhesive is free, or substantially free, of volatile organic compounds, particularly volatile organic solvents. Alternately, the oil-rich rubber-based adhesive may contain oil and volatile organic solvent wherein oil is the major component insofar as the oil and solvent is concerned.

BACKGROUND OF THE INVENTION

Historically, a rubber tire is retreaded by first abrading away its tread and buffing a surface of the remaining rubber carcass.

A strip of sulfur vulcanizable, unvulcanized rubber composition is then applied onto and circumferentially around the periphery of the buffed, cured rubber tire carcass.

Such rubber composition strip is conventionally referred as a "cushion".

Over the cushion may then be applied a pre-cured, shaped rubber tread, to which a vulcanizable or unvulcanizable, and preferably a sulfur vulcanizable, unvulcanized rubber-based adhesive has been applied to the inner surface of the tread to enhance the interfacial adhesion between the tread and aforesaid cushion.

The resulting tire assembly is then conventionally encased in a cured butyl rubber envelope, a vacuum drawn on the envelope, and the enveloped tire assembly inserted in an autoclave and the assembly vulcanized therein at a temperature of, for example, about 130° C. to produce the retreaded tire.

Such method of tire retreading with a pre-cured tread and vulcanizable cushion over an abraded tire carcass is well known to those having skill in such art.

Historically the aforesaid rubber-based adhesive may be applied to the tread stock as a volatile organic solvent solution of the adhesive and then allowed to dry prior to application of the tread to the aforesaid cushion.

However, it is sometimes desired to provide such adhesive, and the accompanying application of the adhesive to a pre-cured tire tread, in a retreading operation without volatile organic compounds, or at least substantially free of volatile organic compounds, which may sometimes be referred to as "VOC's".

In the description of this invention, the term "phr" as used herein, and according to conventional practice, refers to "parts of a respective material per 100 parts by weight of rubber elastomer". In the description of this invention, the terms "rubber" and "elastomer" can be used interchangeably, unless otherwise distinguished.

The terms "rubber composition", "compounded rubber" and "rubber compound" can be used interchangeably to refer to "rubber which has been blended or mixed with various ingredients and materials" and the terms "cure" and "vulcanize" may also be used interchangeably herein, unless otherwise noted and such terms are well known to those having skill in the rubber mixing or rubber compounding art.

SUMMARY AND PRACTICE OF THE INVENTION

In a pneumatic tire retreading operation where a tire carcass is obtained, preferably an abraded vulcanized rubber tire carcass prepared by abrading away its tread and buffing the peripheral surface of the remaining cured tire carcass, to which a strip of a sulfur vulcanizable, unvulcanized rubber composition, or cushion, is circumferentially applied to the abraded peripheral surface of said tire carcass, and to which a pre-cured rubber tread strip, which has a vulcanizable or unvulcanizable, but preferably a sulfur vulcanizable, unvulcanized rubber based adhesive on its inner surface, is applied to said cushion, wherein said rubber based adhesive is located at the interface between said cushion and said tread stock, and wherein the resulting assembly is vulcanized at an elevated temperature to form a retreaded tire; an improvement wherein said adhesive is comprised of an oil rich rubber composition (i) which contains from about 150 to about 1400, alternately about 400 to about 1000, phr of rubber processing oil and is exclusive of volatile organic compounds; or (ii) which contains from about 150 to about 1400, alternatively about 400 to about 1000, phr combination of rubber processing oil and volatile organic solvent wherein the weight ratio of said oil to said solvent is in a range of about 1/0.05 to about 1/0.66, preferably about 1/0.05 to about 1/0.33; wherein said solvent is evaporated from said adhesive layer prior to application of said pre-cured tread strip to said cushion layer.

Accordingly, in one aspect of this invention, a retreaded tire is provided as a concentric circular laminate comprised of:

(a) a cured rubber tire casing, or carcass, having an abraded, or buffed, circumferential peripheral surface;

(b) a concentric, circular, unvulcanized rubber cushion layer having an inner surface and outer surface, wherein the inner surface of said cushion layer is positioned on said outer peripheral surface of said tire casing; and (c) a pre-cured rubber tire tread strip having an inner surface and an outer surface, wherein said inner tread surface contains an unvulcanized oil-rich rubber-based adhesive layer thereon and wherein said pre-cured tread strip is circumferentially positioned on the outer surface of said positioned cushion layer with said adhesive layer therebetween to create a tire assembly, wherein said adhesive layer is comprised of an oil-rich rubber-based composition:

(i) which contains from about 150 to about 1400, alternately about 400 to about 1000, phr of rubber processing oil and is exclusive of volatile organic compounds; or (ii) which contains from about 150 to about 1400, alternatively about 400 to about 1000, phr combination of rubber processing oil and volatile organic solvent wherein the weight ratio of said oil to said solvent is in a range of about 1/0.05 to about 1/0.66, preferably about 1/0.05 to about 1/0.33; wherein said solvent is evaporated from said adhesive layer prior to application of said pre-cured tread strip to said cushion layer.

A retreaded tire is then provided by heating the said tire assembly to an elevated temperature to vulcanized said adhesive cushion layers.

Usually an elevated temperature in a range of about 100° C. to about 150° C. is used for such vulcanization.

The oil-rich, rubber-based, adhesive layer is the oil-rich adhesive provided by this invention.

A significant aspect of the invention is the use of a substantial amount of oil which, in the adhesive, is a rubber processing oil and is therefore compatible with the elastomer composition of the cured elastomer of the tread and unvulcanized elastomer composition of the cushion and with the cured elastomer composition of the tire carcass casing to which the tire tread is applied.

This aspect of the invention relies upon the high level of oil content to provide for solubilizing the rubber of the adhesive to permit application of the adhesive to the inner surface of the pre-cure tread and, after sufficient migration of the oil into the cured tread strip, to also provide protection from premature oxidation of the inner tread surface from the atmosphere and impart a tacky surface to the associated surface tread prior to the actual application of the tread to the cushion.

Suitable oils for this adhesive composition are typical rubber processing oils of viscosities (ASTM D 2161, at 99° C.) ranging from about 30 to about 70 SUS and preferably 30 to 45 SUS; of clay bed analyses (ASTM D 2007) ranging from about 10 to about 90 wt % aromatics, preferably 20 to 50 wt % aromatics; and saturates ranging from about 90 to about 10 wt % saturates, preferably 80% to 50% saturates; aniline point (ASTM D 611) ranging from about 11 to about 121° C. and preferably 15 to 82° C.

Where a volatile organic solvent is used in the oil rich adhesive of this invention, representative solvents are, for example, hexane, heptane and mixtures of liquid hydrocarbons containing from 6 to and including 7 carbon atoms. Preferably, such solvents have a boiling point at atmospheric pressure in a range of about 30° C. to about 130° C.

The adhesive rubber composition may be comprised of various rubbers such as, for example, diene-based rubbers as polymers and copolymers of conjugated diene monomers having from 4 to 10 carbon atoms (e.g. 1,3-butadiene and isoprene), rubbers as copolymers of conjugated diene monomer(s) having from 4 to 10 carbon atoms copolymerized with a vinyl substituted aromatic monomer(s) having from 8 to 12 carbon atoms (e.g., styrene and alpha methylstyrene), and the like, as well as blends thereof. Such rubbers generally contain various antioxidants, fillers such as carbon black, oils, sulfur, accelerators, tackifying resins, antioxidants, stearic acid, antiozonants and the like in conventional amounts.

Representative of such rubbers are, for example, cis 1,4-polyisoprene (natural or synthetic), cis 1,4-polybutadiene and styrene/butadiene copolymer rubber.

Preferably, such rubber is, or is at least primarily comprised of cis 1,4-polyisoprene rubber, preferably natural rubber. For example, such rubber may be natural cis 1,4-polyisoprene rubber or a blend of natural cis 1,4-polyisoprene rubber and at least one of said diene-based rubbers so long as at least 51 weight percent of the rubbers is the natural rubber.

FURTHER DESCRIPTION OF THE INVENTION

Various rubber reinforcing carbon blacks may be used for the adhesive composition such as, for example, ASTM D 3849 grades N550 and N650 and the like.

The adhesive compositions of this invention can optionally, but preferably, include one or more compatible tackifying agents which are utilized in an effective amount to promote good tack (e.g., pressure sensitive tack) with vulcanized elastomeric substrates, such as the tread or even a buffed carcass surface, if desired, and also with uncured, vulcanizable elastomeric substrates (i.e. non-vulcanized or at least substantially non-vulcanized) such as the said cushion layer. The tackifying resins which can be utilized are generally well known to the art and to the literature and generally include rosin and its derivatives and various hydrocarbon resins. The rosin group comprises rosins, modified rosins and their various derivatives such as esters. The hydrocarbon resin group comprises polyterpines, synthetic hydrocarbon resins, and various modified or special resins which are primarily phenolics. Tackifier resins are described in more detail in the Handbook of Pressure-Sensitive Adhesive Technology, edited by Donatas Satas, Van Nostrand Reinhold Company, 1982, Chapter 16, pages 353–369, which is hereby fully incorporated by reference.

Another and preferred type of tackifier for the adhesive are the various phenol-formaldehyde resins. Such resins generally have a number average molecular weight of 2,000 or less. Typically, alkyl phenols are used rather than phenol itself since the alkyl group improves the miscibility of the resin with the rubber. The existence of phenol-formaldehyde tackifiers are well known to the art and to the literature, e.g., "Resins Used in Rubbers" by Paul O. Powers, Rubber Chemistry and Technology, Vol. 36, pages 1542–1562, (1963), and "Role of Phenolic Tackifiers in Polyisoprene Rubber," by F. L. Mangus and G. R. Hamed, Rubber Chemistry and Technology, vol. 64, pages 65–73 (1991).

The present invention relates to a vulcanizable or unvulcanizable system, but the preferable vulcanizable system relates to sulfur cure systems and include one or more cure accelerators in the adhesive composition for this invention. Suitable amounts of sulfur and/or sulfur donor-type compounds generally range from about 1 to about 10 and preferably from about 2 to about 5 phr. The amounts of sulfur vulcanization accelerator generally range from about 0.2 to about 4 and preferably from about 0.5 to about 2.0 phr. Various sulfur accelerators can be used such as aldehyde-amine accelerators, e.g., the reaction product of butyraldehyde and aniline, amines such as hexamethylene tetramine, guanidines such as diphenyl guanidine, thioureas, sulfenamides, thiazoles, and the like. Activators such as zinc oxide, stearic acid, litharge, magnesia and amines can also be used in conventional amounts to attain good crosslinking efficiency.

The oil rich adhesive compositions of the invention can also include conventional amounts of various known rubber compounding ingredients such as processing aids, stabilizers, antidegradants, and the like. Suitable antioxidants include alkylated hindered phenols, alkylated or arylalkylated diphenylamines, aminophenols, dialkyl- diaryl- or mixed alkyl-aryl-p-phenylenediamines, and aniline plus ketone or aldehyde condensation products.

The uncured elastomeric adhesive composition of the present invention can be vulcanized by heat or radiation according to any conventional vulcanization process. Typically, the vulcanization is conducted at a temperature ranging from about 100° C. to about 250° C. or preferably from about 120° C. to about 170° C. for a time period ranging from about 1 to about 300 minutes.

The present invention can be utilized to form a retreaded tire, as a laminate of tread, cushion and carcass, for various types of vehicle tires such as passenger car tires, light and medium truck tires, off the road tires, and preferably is utilized in forming retreaded laminates for aircraft and medium truck tires.

To prepare the highly oil rich adhesive compositions, a conventional masterbatch may be first prepared by conventional mixing techniques including, e.g., kneading, roller milling, extruder mixing, internal mixing (such as with a Banbury® mixer), etc. Such masterbatches may contain conventional amounts of rubber processing oil (0 to about 100 phr oil). The sequence of mixing and temperatures employed are well known to skilled rubber compounders, the objective being the dispersion of fillers, activators, curatives in the polymer without excessive heat buildup.

Additional rubber processing oil may then be incorporated into the masterbatch in mixers designed for lower viscosity materials such as paints or caulks. Such mixers include those with high speed dispersion blades such as a churn.

Curatives may be incorporated into the conventional masterbatch, or during the subsequent addition of the extra oil.

The following examples serve to illustrate the invention in detail but do not limit the same thereto.

The amounts or parts, are by weight unless otherwise indicated.

EXAMPLE I

An adhesive composition masterbatch is prepared of natural cis 1,4-polyisoprene rubber, carbon black, zinc oxide, stearic acid and resin as shown in the following Table I.

The masterbatch is prepared by mixing in four mixing stages, namely a first non-productive mixing stage in an internal mixer in which only natural rubber is masticated, followed by a second non-productive mixing stage in an internal mixer in which the rubber and ingredients were added except for the sulfur, vulcanization accelerators and an antidegradant, followed by a third non-productive mixing stage in an internal mixer in which said ingredients are then re-mixed without further addition of ingredients, followed by a productive mixing stage an internal mixer in which sulfur, vulcanization accelerators and an antioxidant are added.

The masterbatch is identified herein as Sample A.

TABLE 1

Masterbatch

| Ingredients | Sample A |
|---|---|
| Non Productive Mixing Stages | |
| Natural rubber[1] | 100 |
| Carbon black[2] | 20 |
| Stearic acid | 2 |
| Zinc oxide | 8.5 |
| Peptizer and resin[3] | 10.3 |
| Sulfonic acid[4] | 3 |
| Productive Mixing Stage | |
| Sulfur | 5 |
| Accelerator(s)[5] | 0.9 |
| Antidegradant | 0.8 |

[1]Natural cis 1,4-polyisoprene rubber
[2]N650 carbon black, an ASTM designation
[3]Piccopale 100 resin from the Hercules company
[4]Reogen E from the Struktol company
[5]Of the benzothiazyl disulfide and benzothiazole sulfenamide types The masterbatch rubber composition of Table 1 is blended with, either volatile organic compounds, as, variously, isopropyl alcohol, toluene and/or heptane, and/or with a quantitative amount of petroleum processing oil in an internal mixer with high speed dispersion blades and identified herein as Samples B, C and D, respectively as shown in the following Table 2, with Sample B being a control sample.

TABLE 2

| Ingredients | Sample B | Sample C | Sample D |
|---|---|---|---|
| Non Productive Mixing Stages | | | |
| Sample A[1] | 150 | 150 | 150 |
| Rosin oil[2] | 3 | 3 | 3 |
| Isopropyl alcohol | 17 | 0 | 0 |
| Toluene | 90 | 0 | 0 |
| Heptane | 547 | 0 | 241 |
| Process oil[4] | 0 | 654 | 413 |

[1]As the masterbatch from Example I
[2]A rosin oil as London Oil from the Natrochem, Inc. company
[3]As heptane from the Shell company as Tolusol A
[4]Napthenic oil as Tufflo 100 oil from the Lyondell company The cement Samples B, C and D were individually applied to a buffed (cured) tire tread surface. The volatile organic compound-containing cement (Samples Band D) was allowed to dry. The oil rich versions, namely Sample C and Sample D, were allowed to set, allowing migration of the oil into the tread until sufficient tack was developed.

The tack of the applied cements to the buffed tread surface was then evaluated by applying unvulcanized rubber cushion against the cemented substrate and removing the cushion to visually assess physical tack level.

The visual results of the tack test are shown in the following Table 3.

TABLE 3

Tack Test

| Period of Time | Sample B | Sample C | Sample D |
|---|---|---|---|
| 1 day | 4 | 2–3 | 2.5 |
| 6 days | 4 | 3–4 | 3–3.5 |
| 1 month | 4 | 4 | 4 |
| 2.5 months | 4 | 4 | 4 |
| 4 months | 4 | 4 | 4 |
| 5.5 months | 4 | 4.5 | 4.5 |
| 7 months | 4 | 4.5 | 4.5 |

In the above Table 3, the Samples are visually inspected after the indicated periods of time and visual results of the above referenced tack test are observed and summarized in Table 3. A rating of 5 would be a highest available rating which would indicate optimum physical contact and a rating of 1 would be a lowest available rating which would indicate unacceptable physical tack.

It is readily seen from Table 3 that both oil-rich adhesive Samples C and D provide comparable overall tack when compared to solvent based adhesive Sample B (the Control Sample).

This is considered herein as being significant because the observed tack for Control Sample B is considered herein to be widely acceptable in the tire retreading field.

EXAMPLE II

Retreaded tires are prepared by first individually applying adhesive Samples B, C and D to pre-cured tread strips. A cushion is circumferentially applied to the periphery of a buffed tire carcass. To the cushion is applied the pre-cured tread strip with its adhesive layer against the cushion layer. The resulting tread/adhesive/cushion/carcass assembly is placed in a suitable bag, a vacuum drawn on the bag to securely position the precured tread against the cushion and carcass. The bagged assembly is placed in a suitable autoclave at a temperature of about 127° C. for about 165 minutes to cure the assembly and form the retreaded tire. The bagged, cured assembly is then removed from the autoclave and allowed to cool to about 100° C. and the resulting retreaded tire removed from the bag.

It is considered that the retreaded tires prepared with the oil rich adhesive of Samples C and D is substantially equivalent to the retreaded tire prepared with the solvent based adhesive of Sample B insofar as adhesion is concerned.

While certain representative embodiments and details have been shown for the purpose of illustrating the invention, it will be apparent to those skilled in this art that various changes and modifications may be made therein without departing from the spirit or scope of the invention.

What is claimed is:

1. In a pneumatic tire retreading process where a vulcanized rubber tire casing is obtained having an abraded peripheral surface without a tread portion, to which a cushion strip of a sulfur vulcanizable, unvulcanized rubber composition is circumferentially applied to the said abraded peripheral surface of said tire casing, and to which a pre-cured rubber tread strip, which has an unvulcanized rubber based adhesive on its inner surface, is circumferentially applied to said cushion, with said rubber based adhesive positioned between said cushion and said tread strip, to form a retreaded tire assembly and wherein the said resulting assembly is vulcanized at an elevated temperature to form a retreaded tire; an improvement wherein said adhesive is comprised of an oil rich rubber composition
   (i) which contains from about 150 to about 1400 phr of rubber processing oil and is exclusive of volatile organic compounds; or
   (ii) which contains from about 150 to about 1400 phr combination of rubber processing oil and volatile organic solvent wherein the weight ratio of said oil to said solvent is in a range of about 1/0.05 to about 1/0.66; wherein said solvent is evaporated from said adhesive layer prior to application of said pre-cured tread strip to said cushion layer.

2. The process of claim 1 wherein said oil-rich rubber-based adhesive contains from about 150 to about 1400 phr of rubber processing oil and is exclusive of volatile organic compounds.

3. The process of claim 1 wherein said oil-rich rubber-based adhesive contains from about 150 to about 1400 phr combination of rubber processing oil and volatile organic solvent wherein the weight ratio of said oil to said solvent is in a range of about 1/0.05 to about 1/0.66.

4. The process of claim 3 wherein said organic solvent has a boiling point at atmospheric pressure within about 30° C. to about 130° C. and is selected from at least one of the group consisting of hexane, heptane and hydrocarbon mixture comprised of hydrocarbons having from 6 to 7 carbon atoms.

5. The process of claim 1 wherein the rubber for said adhesive is comprised of cis 1,4-polyisoprene, natural rubber and at least one of cis 1,4-polybutadiene rubber and styrene/butadiene rubber; wherein at least 51 weight percent of rubbers is said natural rubber.

6. The process of claim 1, wherein the amount of said oil in said oil-rich adhesive is from about 400 to about 1000 phr and the rubber for said oil-rich adhesive is cis 1,4-polyisoprene natural rubber.

7. The process tire of claim 1, wherein said oil-rich adhesive contains from about 1 to about 15 phr of a tackifier, wherein said tackifier is an elastomer-compatible tackifying resin comprised of at least one of modified rosin phenol formaldehyde modified rosin.

8. The process of claim 1 wherein the of said oil in said adhesive is a rubber processing oil having a viscosity according to ASTM D 2161, at 99° C. in a range of from about 30 to about 70 SUS, and comprised of from about 10 to about 90 weight percent aromatics, and correspondingly about 90 to about 10 weight percent saturates and an aniline point (ASTM D 611) in a range of about 11° C. to about 121° C.

9. The process of claim 1 wherein the rubber in said oil-rich adhesive is cis 1,4-polyisoprene natural rubber.

10. A retreaded tire prepared according to the process of claim 1.

11. A retreaded tire comprised of a concentric circular laminate comprised of:
   (a) a cured rubber tire casing, or carcass, having an abraded outer circumferential peripheral surface;
   (b) a concentric, circular, unvulcanized rubber cushion layer having an inner surface and outer surface, wherein the inner surface of said cushion layer is positioned on said outer peripheral surface of said tire casing; and
   (c) a pre-cured rubber tire tread strip having an inner surface and an outer surface, wherein said inner tread surface contains an unvulcanized oil-rich rubber-based adhesive layer thereon and wherein said pre-cured tread strip is circumferentially positioned on the outer surface of said positioned cushion layer with said adhesive layer therebetween to create a tire assembly; wherein said oil-rich rubber-based adhesive layer is comprised of a diene hydrocarbon based elastomer
      (i) which contains from about 150 to about 1400 phr of rubber processing oil and is exclusive of volatile organic compounds; or
      (ii) which contains from about 150 to about 1400 phr combination of rubber processing oil and volatile organic solvent wherein the weight ratio of said oil to said solvent is in a range of about 1/0.05 to about 1/0.66; wherein said solvent is evaporated from said adhesive layer prior to application of said pre-cured tread strip to said cushion layer.

12. The retreaded tire of claim 11 wherein said oil-rich rubber-based adhesive contains from about 150 to about 1400 phr of rubber processing oil and is exclusive of volatile organic compounds.

13. The retreaded tire of claim 11 wherein said oil-rich rubber-based adhesive contains from about 150 to about 1400 phr combination of rubber processing oil and volatile organic solvent wherein the weight ratio of said oil to said solvent is in a range of about 1/0.05 to about 1/0.66.

14. The retreaded tire of claim 13 wherein said organic solvent has a boiling point at atmospheric pressure within about 30° C. to about 130° C. and is selected from at least one of the group consisting of hexane, heptane and hydrocarbon mixture comprised of hydrocarbons having from 6 to 7 carbon atoms.

15. The retreaded tire of claim 11 wherein said oil-rich adhesive contains from about 1 to about 15 phr of a tackifier, wherein said tackifier is an elastomer-compatible tackifying resin comprised of at least one of modified rosin phenol formaldehyde modified rosin.

16. The retreaded tire of claim 11 wherein the of said oil in said adhesive is a rubber, processing oil having a viscosity according to ASTM D 2161, at 99° C. in a range of from about 30 to about 70 SUS, and comprised of from about 10 to about 90 weight aromatics, and correspondingly about 90 to about 10 weight percent saturates and an aniline point (ASTM D 611) in a range of about 11° C. to about 121° C.

17. The retreaded tire of claim 11 wherein the rubber for said adhesive is comprise of cis 1,4-polyisoprene, natural rubber and at least one of cis 1,4-polybutadiene rubber and styrene/butadiene rubber; wherein at least 51 weight percent of rubbers is said natural rubber.

18. The retreaded tire of claim 11 wherein the rubber in said oil-rich adhesive is cis 1,4-polyisoprene natural rubber.

19. The retreaded tire of claim 11 wherein said oil-rich rubber-based adhesive contains from about 400 to about 1000 phr of rubber processing oil and is exclusive of volatile organic compounds and wherein the rubber for said oil rich adhesive is comprised of cis 1,4-polyisoprene rubber.

20. The retreaded tire of claim 11 wherein said oil-rich rubber-based adhesive contains from about 400 to about 100 phr combination of rubber processing oil and volatile organic solvent wherein the weight ratio of said oil to said solvent is in a range of about 1/0.05 to about 1/0.66; and wherein the rubber for said oil-rich adhesive is comprised of cis 1,4-polyisoprene rubber.

* * * * *